US011029388B2

(12) United States Patent
Melzer et al.

(10) Patent No.: US 11,029,388 B2
(45) Date of Patent: Jun. 8, 2021

(54) SPECTRAL ESTIMATION OF NOISE IN RADAR APPARATUS

(71) Applicant: Infineon Technologies AG, Neubiberg (DE)

(72) Inventors: Alexander Melzer, Neutillmitsch (AT); Michael Gerstmair, Langenstein (AT); Mario Huemer, Alkoven (AT); Alexander Onic, Linz (AT); Christian Schmid, Linz (AT); Rainer Stuhlberger, Puchenau (AT)

(73) Assignee: Infineon Technologies AG

( * ) Notice: Subject to any disclaimer, the term of this patent is extended or adjusted under 35 U.S.C. 154(b) by 319 days.

(21) Appl. No.: 16/259,160

(22) Filed: Jan. 28, 2019

(65) Prior Publication Data

US 2019/0235051 A1     Aug. 1, 2019

(30) Foreign Application Priority Data

Jan. 29, 2018 (DE) .......................... 102018101880.0
Apr. 6, 2018 (DE) .......................... 102018108219.3

(51) Int. Cl.
*G01S 7/40* (2006.01)
*G01S 13/34* (2006.01)
(Continued)

(52) U.S. Cl.
CPC ...... *G01S 7/40* (2013.01); *G01S 7/03* (2013.01); *G01S 7/032* (2013.01); *G01S 7/354* (2013.01);
(Continued)

(58) Field of Classification Search
CPC ...... G01S 13/343; G01S 13/87; G01S 13/931; G01S 7/03; G01S 7/032; G01S 7/354; G01S 7/40; G01S 7/4017
See application file for complete search history.

(56) References Cited

U.S. PATENT DOCUMENTS 8,525,604 B2   9/2013  Jacobsson et al.
10,205,541 B2  2/2019  Frank et al.
(Continued)

FOREIGN PATENT DOCUMENTS

CN    106932765 A   7/2017
EP      2881752 A1   6/2015
(Continued)

OTHER PUBLICATIONS

Morteza, Nick et al., "Phase-Noise Measurement Using Two Inter-Injection-Locked Microwave Oscillators". IEEE Transactions on Microwave Theory and Techniques; Jul. 2006, vol. 54, Issue: 7, pp. 2993-3000, [Online] URL: <https://ieeexplore.ieee.org/document/1650439>.

(Continued)

*Primary Examiner* — Olumide Ajibade Akonai
(74) *Attorney, Agent, or Firm* — Design IP

(57) ABSTRACT

A method is described that, according to one exemplary embodiment, involves the following: generating a first radio frequency (RF) signal by a first RF oscillator and a second RF signal by a second RF oscillator, mixing the first RF signal and the second RF signal by a mixer to generate a mixer output signal, digitizing the mixer output signal to generate a digitized signal, and calculating an estimate for a power spectral density of the mixer output signal from the digitized signal. Based on the estimate for the power spectral density of the mixer output signal, an estimate for a noise power spectral density characterizing the noise contained in the first and the second RF signals is calculated.

20 Claims, 4 Drawing Sheets

(51) Int. Cl.
*G01S 13/87* (2006.01)
*G01S 7/03* (2006.01)
*G01S 13/931* (2020.01)
*G01S 7/35* (2006.01)

(52) U.S. Cl.
CPC .......... *G01S 7/4017* (2013.01); *G01S 13/343* (2013.01); *G01S 13/87* (2013.01); *G01S 13/931* (2013.01)

(56) References Cited

U.S. PATENT DOCUMENTS

| | | | | |
|---|---|---|---|---|
| 2005/0096859 | A1* | 5/2005 | Torin | ..................... G01R 29/26 702/69 |
| 2016/0079991 | A1* | 3/2016 | Pelissier | ................. G06F 30/30 327/158 |
| 2017/0153318 | A1 | 6/2017 | Melzer et al. | |
| 2017/0176574 | A1* | 6/2017 | Eswaran | ................ G01S 13/343 |
| 2017/0315214 | A1 | 11/2017 | Steinbuch et al. | |

FOREIGN PATENT DOCUMENTS

| | | |
|---|---|---|
| JP | 04350576 A | 4/1992 |
| JP | 2008292244 A | 12/2008 |
| JP | 2010530706 A | 9/2010 |
| JP | 3213331 U | 11/2017 |
| JP | 2017533432 A | 11/2017 |

OTHER PUBLICATIONS

Melzer, Alexander, et al. "Short-Range Leakage Cancelation in FMCW Radar Transceivers Using an Artificial On-Chip Target." IEEE Journal of Selected Topics in Signal Processing, vol. 9, No. 8 (Dec. 2015), pp. 1650-1660.

* cited by examiner

| First test:<br>MMIC 1+2 | Second test:<br>MMIC 1+3 | Third test:<br>MMIC 2+3 | Result |
|---|---|---|---|
| passed | --- | --- | LO in master MMIC 1 in order |
| failed | passed | --- | LO in master MMIC 1 in order,<br>LO in MMIC 2 defective |
| failed | failed | passed | LO in master MMIC 1 defective |
| failed | failed | failed | inconclusive |

SPECTRAL ESTIMATION OF NOISE IN RADAR APPARATUS

FIELD

The present description relates to the field of radio frequency (RF) circuits. Some exemplary embodiments relate to an apparatus having two or more cascaded monolithic microwave integrated circuits (MMICs) that can be used, for example, in radar sensors.

BACKGROUND

Radio frequency (RF) transmitters and receivers can be found in a large number of applications, in particular in the field of wireless communication and radar sensors. In the automotive sector, there is an increasing need for radar sensors that can be used in driving assistance systems (Advanced driver assistance systems, ADAS), inter alia, such as e.g. in adaptive cruise control (ACC, or Radar Cruise Control) systems. Such systems can automatically adapt the speed of an automobile so as to keep a safe distance from other automobiles travelling in front (and from other objects and from pedestrians). Further applications in the automotive sector are e.g. blindspot detection, lane change assist and the like.

Modern radar systems use large scale integrated RF circuits that can combine all the core functions of an RF frontend of a radar transceiver in a single package (single chip radar transceiver). Large scale integration RF circuits of this kind are usually referred to as MMICs. An RF frontend usually (but not necessarily) contains, inter alia, a voltage controlled oscillator (VCO) connected in a phase locked loop, power amplifiers (PAs), directional couplers, mixers and associated control circuit arrangements for controlling and monitoring the RF frontend. An MMIC can also have circuits for the analog signal processing in baseband (or in an intermediate frequency band) and analog-to-digital converters (ADCs) in order to allow digital signal processing. Instead of VCOs, it is also possible for digitally controlled oscillators (DCOs) to be used, depending on the application. In sensor applications, it is also possible for multiple MMICs to be interconnected (cascaded), for example in order to emit and/or receive RF radar signals via multiple antennas. Such arrangements having multiple antennas can be used for beamforming techniques, for example. Multiple reception antennas are necessary when the angle of incidence of the received radar echoes (DoA, Direction of Arrival) is intended to be ascertained, inter alia.

In radar applications, the noise floor contained in the RF signals directly influences the attainable accuracy and also the reliability of the measured values obtained. Quantitative estimation and monitoring of the noise can be relevant—for example in automotive applications—in regard to standardized requirements relating to functional safety. The relevant standard for this is ISO 26262.

SUMMARY

A method is described that, according to one exemplary embodiment, involves the following: generating a first RF signal by means of a first RF oscillator and a second RF signal by means of a second RF oscillator, mixing the first RF signal and the second RF signal by means of a mixer, digitizing the mixer output signal and calculating an estimate for the power spectral density of the mixer output signal from the digitized signal. Based on the estimate for the power spectral density of the mixer output signal, an estimate for the noise power spectral density characterizing the noise contained in the first and second RF signals is calculated.

In addition, a circuit arrangement is described. According to one exemplary embodiment, the circuit arrangement has the following: a first RF oscillator designed to generate a first RF signal and a second RF oscillator designed to generate a second RF signal, a mixer designed to receive the first RF signal and the second RF signal as input signals, and an analog-to-digital converter, connected downstream of the mixer, designed to digitize a mixer output signal provided by the mixer. A computation unit is designed to receive the digitized mixer output signal and to take it as a basis for calculating an estimate of the power spectral density of the mixer output signal, and to take the calculated estimate for the power spectral density of the mixer output signal as a basis for calculating an estimate for the noise power spectral density characterizing the noise contained in the first and second RF signals.

BRIEF DESCRIPTION OF THE DRAWINGS

Exemplary embodiments are explained in more detail below on the basis of figures. The depictions are not necessarily to scale and the exemplary embodiments are not restricted just to the depicted aspects. Rather, importance is attached to depicting the principles on which the exemplary embodiments are based. In the figures.

DETAILED DESCRIPTION

The exemplary embodiments described here are described within the context of a radar receiver or transceiver. The various exemplary embodiments described here are not restricted to radar applications, however, and can also be used in other areas, for example in RF transceivers of RF communication apparatuses.

Figure 1:
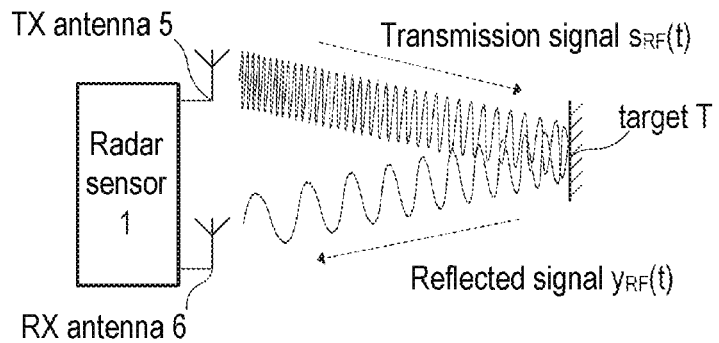
FIG. 1 is an outline to illustrate the operating principle of an FMCW radar system for measuring distance and/or speed.

FIG. 1 illustrates the use of an FMCW radar system as a sensor for measuring distances and speeds of objects, which are usually referred to as radar targets. In the present example, the radar apparatus 10 has separate transmission (TX) and reception (RX) antennas 5 and 6 (bistatic or pseudo-monostatic radar configuration). However, it should be noted that it is also possible for a single antenna to be used that serves as a transmission antenna and a reception antenna at the same time (monostatic radar configuration). The transmission antenna 5 emits a continuous RF signal $s_{RF}(t)$, which is frequency modulated with a linear chirp signal (periodic, linear frequency ramp), for example. The emitted signal $s_{RF}(t)$ is backscattered from the radar target T and the backscattered (reflected) signal $y_{RF}(t)$ is received by the reception antenna 6.

Figure 2:
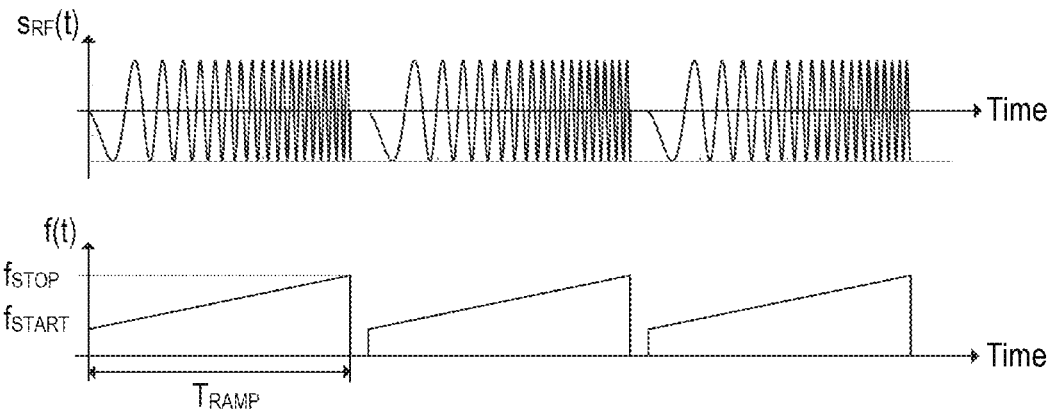
FIG. 2 comprises two timing diagrams to illustrate the frequency modulation of the RF signal generated by the FMCW system.

FIG. 2 illustrates the aforementioned frequency modulation of the signal $s_{RF}(t)$ by way of example. As depicted in FIG. 2, the signal $s_{RF}(t)$ is made up of a set of "chirps", i.e. signal $s_{RF}(t)$ comprises a sequence of sinusoidal waveforms with a rising (up-chirp) or falling (down-chirp) frequency (see upper graph in FIG. 2). In the present example, the instantaneous frequency f(t) of a chirp rises linearly, beginning at a starting frequency $f_{START}$, to a stop frequency $f_{STOP}$ within a period $T_{RAMP}$ (see lower graph in FIG. 2). Such chirps are also referred to as a linear frequency ramp. FIG. 2 depicts three identical linear frequency ramps. However, it should be noted that the parameters $f_{START}$, $f_{STOP}$, $T_{RAMP}$ and the pause between the individual frequency ramps can vary. The frequency variation must also not necessarily be linear. Depending on the implementation, it is also possible for transmission signals having exponential (exponential chirps) or hyperbolic (hyperbolic chirps) frequency variation to be used, for example.

Figure 3:
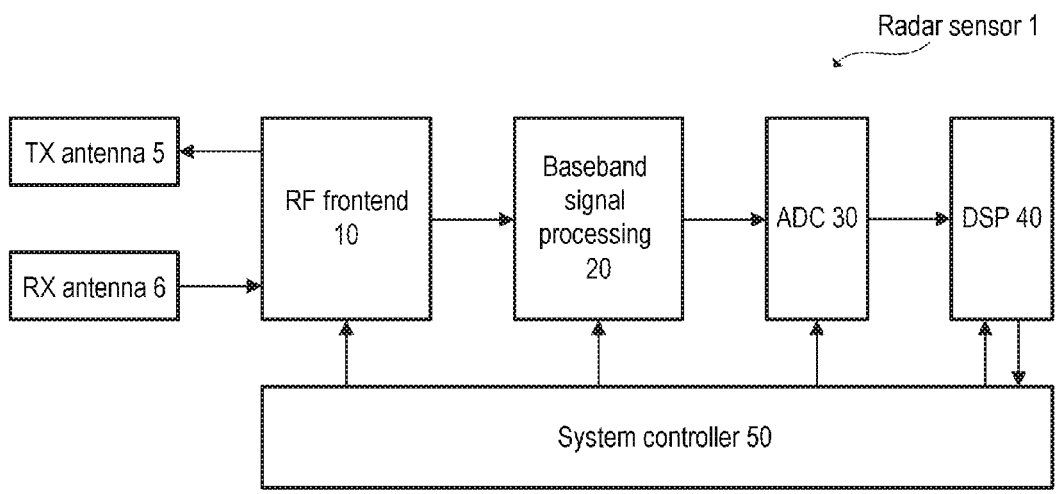
FIG. 3 is a block diagram to illustrate the basic structure of an FMCW radar system.

FIG. 3 is a block diagram depicting a possible structure of a radar apparatus 1 (radar sensor) by way of example. Similar structures can e.g. also be found in RF transceivers used in other applications, such as e.g. wireless communication systems. Accordingly, at least one transmission antenna 5 (TX antenna) and at least one reception antenna 6 (RX antenna) are connected to an RF frontend 10, which can contain all those circuit components that are needed for the RF signal processing. By way of example, these circuit components comprise a local oscillator (LO), RF power amplifiers, low-noise amplifiers (LNAs), directional couplers (e.g. rat-race couplers, circulators, etc.) and mixers for down-converting the RF signals to baseband or an intermediate frequency band (IF band). The RF frontend 10 can be integrated—possibly together with further circuit components—into a monolithic microwave integrated circuit (MMIC). The example depicted shows a bistatic (or pseudo-monostatic) radar system having separate RX and TX antennas. In the case of a monostatic radar system, a single antenna would be used both for emitting and for receiving the electromagnetic (radar) signals. In this case, a directional coupler (e.g. a circulator) can be used to separate the RF signals that are to be emitted to the radar channel from the RF signals received from the radar channel (radar echoes). Radar systems for the most part have multiple transmission and reception channels having multiple transmission and reception antennas in practice, this allowing measurement of the direction (DoA, direction of arrival) from which the radar echoes are received, inter alia.

In the case of a frequency modulated continuous wave radar system (FMCW radar system), the RF signals emitted via the TX antenna 5 can be e.g. in the range from approximately 20 GHz to 100 GHz (e.g. around 77 GHz in some applications). As mentioned, the RF signal received by the RX antenna 6 comprises the radar echoes, i.e. those signal components backscattered from one or more radar targets. The received RF signal $y_{RF}(t)$ is e.g. down-converted to baseband and processed further in baseband by means of analog signal processing (see FIG. 3, analog baseband signal processing chain 20). Said analog signal processing substantially comprises filtering and possibly boosting of the baseband signal. The baseband signal is finally digitized (see FIG. 3, analog-to-digital converter 30) and processed further in the digital domain. At least part of the digital signal processing chain can be realized as software that can be executed on a processor, for example a microcontroller or a digital signal processor (see FIG. 3, DSP 40). The entire system is normally controlled by means of a system controller 50, at least part of which can likewise be implemented as software that can be executed on a processor such as e.g. a microcontroller. The RF frontend 10 and the analog baseband signal processing chain 20 (optionally also the analog-to-digital converter 30) can be integrated together in a single MMIC (i.e. an RF semiconductor chip). Alternatively, the individual components can also be distributed over multiple integrated circuits.

Figure 4:
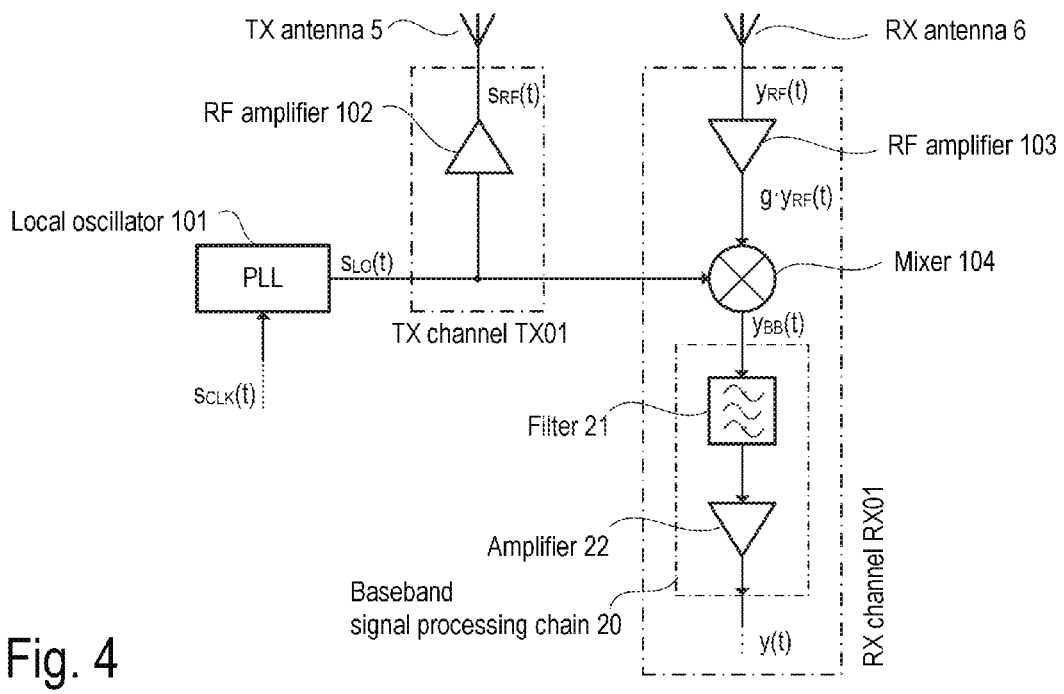
FIG. 4 is a block diagram to illustrate an exemplary implementation of a transmission channel and a reception channel of a radar system.

FIG. 4 illustrates an exemplary implementation of the RF frontend 10 with a downstream baseband signal processing chain 20, these possibly being part of the radar sensor from FIG. 3. It should be noted that FIG. 4 depicts a simplified circuit diagram in order to show the basic structure of the RF frontend with a transmission channel (TX channel TX01) and a reception channel (RX channel RX01). Actual implementations, which can be highly dependent on the specific application, can naturally be more complex and normally have multiple TX and/or RX channels. The RF frontend 10 comprises a local oscillator 101 (LO) that generates an RF oscillator signal $s_{LO}(t)$. The RF oscillator signal $s_{LO}(t)$ can, as described above with reference to FIG. 2, be frequency modulated and is also referred to as an LO signal. In radar applications, the LO signal is usually in the SHF (Super High Frequency) or EHF (Extremely High Frequency) band, e.g. in the range from 76 GHz to 81 GHz for some automotive applications.

The LO signal $s_{LO}(t)$ is processed both in the transmission signal path (in the TX channel) and in the received signal path (in the RX channel). The transmission signal $s_{RF}(t)$ (cf. FIG. 2) emitted by the TX antenna 5 is generated by boosting the LO signal $s_{LO}(t)$, for example by means of the RF power amplifier 102, and is therefore merely a boosted version of the LO signal $s_{LO}(t)$. The output of the amplifier 102 can be coupled to the TX antenna 5 (in the case of a bistatic or pseudo-monostatic radar configuration). The received signal $y_{RF}(t)$ received by the RX antenna 6 is supplied to the receiver circuit in the RX channel and hence directly or indirectly to the RF port of the mixer 104. The received signal path (the RX channel) substantially has a heterodyne receiver. In the present example, the RF received signal $y_{RF}(t)$ (antenna signal) is preamplified by means of the amplifier 103 (gain g). The mixer 104 is thus supplied with the boosted RF received signal g $y_{RF}(t)$ The amplifier 103 can be e.g. an LNA. The reference port of the mixer 104 is supplied with the LO signal $s_{LO}(t)$, so that the mixer 104 down-converts the (preamplified) RF received signal $y_{RF}(t)$ to baseband. The down-converted baseband signal (mixer output signal) is denoted by $y_{BB}(t)$. This baseband signal $y_{BB}(t)$ is initially processed further in analog fashion, the analog baseband signal processing chain 20 substantially being able to have amplification (amplifier 22) and filtering (e.g. bandpass filter 21) in order to reject undesirable sidebands and intermediate frequencies. The resulting analog output signal, which can be supplied to an analog-to-digital converter (see FIG. 3, ADC 30), is denoted by y(t). Methods for digitally further processing the output signal (digital radar signal) are known per se (for example range-Doppler analysis) and are thus not discussed further here.

In the present example, the mixer 104 down-converts the preamplified RF received signal g $y_{RF}(t)$ (i.e. the boosted antenna signal) to baseband. The mixing can be effected in one stage (that is to say from the RF band directly to baseband) or via one or more intermediate stages (that is to say from the RF band to an intermediate frequency band and on to baseband). In this case, the reception mixer 104 effectively comprises multiple series-connected individual mixer stages. In view of the example shown in FIG. 4, it becomes clear that the quality of a radar measurement is highly dependent on the quality of the LO signal $s_{LO}(t)$, for example on the noise contained in the LO signal $s_{LO}(t)$, which noise is quantitatively determined by the phase noise of the local oscillator 101.

In radar systems, the noise floor limits the sensitivity with which radar targets can be detected, and consequently it also limits the accuracy of distance measurement. Phase noise can result in a decrease in the reliability of the measured values or can even make it impossible to detect radar targets (in particular having small radar cross sections). At any rate, it is of benefit to the functional safety of a radar sensor to quantitatively estimate and observe the noise contained in an LO signal, and in particular the phase noise, while the radar sensor is operating.

Figure 5:
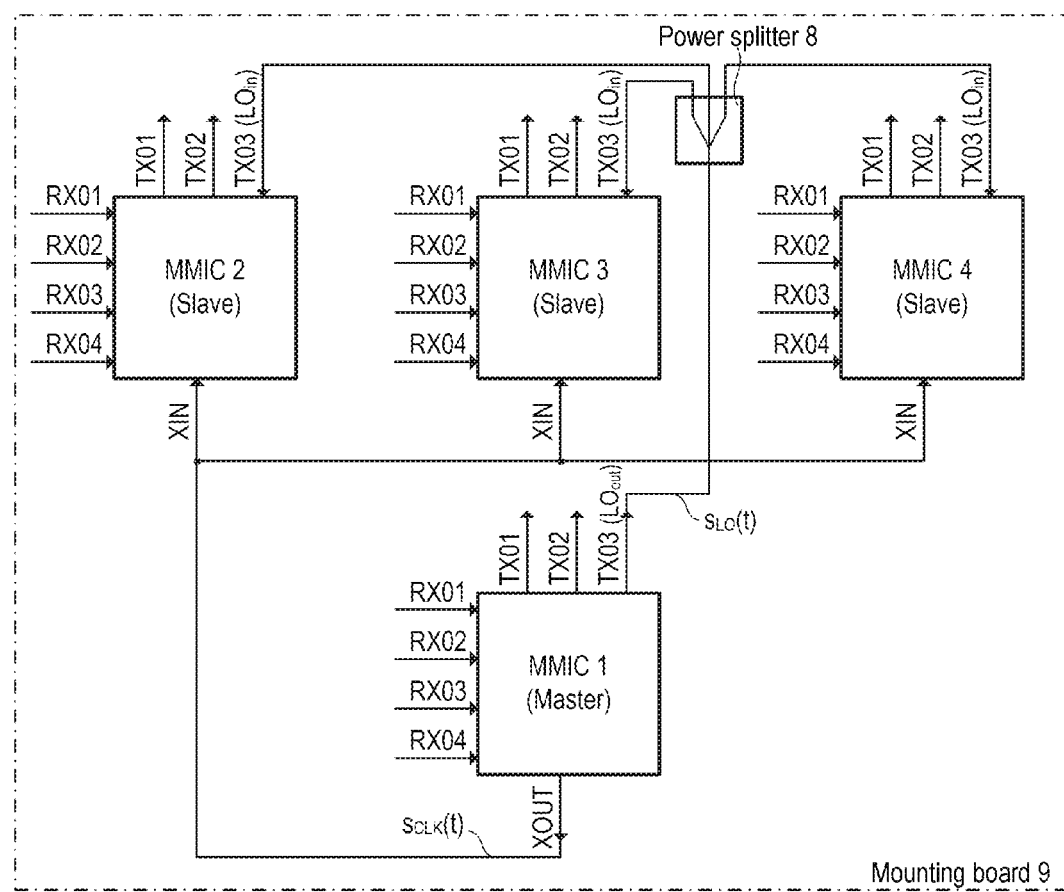
FIG. 5 is a block diagram to illustrate a system having multiple cascaded MMICs, wherein the local oscillator signal is generated by a master MMIC and distributed to the slave MMICs.

FIG. 5 is a block diagram depicting an MIMO radar system having multiple coupled (cascaded) MMICs by way of example. In the example depicted, four MMICs are arranged on a support 9, for example a printed circuit board (PCB). Each MMIC 1, 2, 3 and 4 can have multiple transmission channels TX01, TX02, etc., and multiple reception channels RX01, RX02, etc. It is important to the operation of the radar system that the LO signals used by the MMICs are coherent. Therefore, the LO signal is generated only in one MMIC—the master MMIC 1—and is distributed to the slave MMICs 2, 3 and 4. In the example depicted, this involves the LO signal $s_{LO}(t)$ being routed from an LO output $LO_{out}$ of the master MMIC 1 to the input of a power splitter 8; the outputs of the power splitter are connected to LO inputs $LO_{in}$ of the respective slave MMICs 2, 3 and 4. The LO output $LO_{out}$ and the LO inputs $LO_{in}$ are produced as a pin, as a solder ball or the like, depending on the chip package. In some exemplary embodiments, the LO output $LO_{out}$ and/or the LO inputs $LO_{in}$ can be produced by dedicated external contacts (e.g. pin, solder ball, etc.). In order to keep down the number of external contacts of the MMICs, the output of a transmission channel (e.g. channel TX03) can also be configured as an LO output or LO input. A transmission channel configured as an LO output or LO input is then no longer available for connection to a (transmission) antenna, however. According to the example depicted in FIG. 5, the RF output of the transmission channel TX03 can be configured as an LO output in the master MMIC 1, which merely requires the gain of the RF amplifier (cf. FIG. 4, amplifier 102) to be adapted. The resultant adaptation (reduction) of the signal power is necessary, since an LO output normally needs to provide less signal power than an antenna output. In the case of the slave MMICs 2, 3 and 4, the RF outputs of the respective transmission channels TX03 are configured as LO inputs, this being able to be realized by means of couplers and/or switches.

In the example depicted, the outputs denoted by TX01 and TX02 can be connected to (transmission) antennas and the inputs denoted by RX01, RX02, RX03 and RX04 can be connected to (reception) antennas. The connection between the MMICs and the power splitter 8 can be produced e.g. by means of (e.g. differential) strip lines on the mounting board 9. The power splitter 8 can also be produced by means of strip lines on the mounting board 9 (e.g. as a Wilkinson splitter). At this juncture, it should be pointed out that all MMICs can have local oscillators 101 (e.g. PLLs), but these are not used in the MMICs 2-4 configured as slaves.

In the example depicted in FIG. 5, the master MMIC 1 generates the LO signal $s_{LO}(t)$ and distributes it to the slave MMICs 2, 3 and 4 via the LO output of the master MMIC 1, as a result of which multiple MMICs can be connected (cascaded) in series. The (system) clock signal $s_{CLK}(t)$ is likewise generated by the master MMIC 1 and distributed to the slave MMICs 2, 3 and 4. For this purpose, the MMICs 1, 2, 3 and 4 have separate clock outputs XOUT and clock inputs XIN, which can be connected by means of strip lines. The clock signal $s_{CLK}(t)$ can have a clock frequency of a few MHz (e.g. 200 MHz), whereas the LO signal has an LO frequency $f_{LO}$ of multiple GHz (e.g. 76-81 GHz). Alternatively, the clock signal can also be generated in a separate clock generator chip, which can contain e.g. a crystal oscillator. In this case, the clock signal $s_{CLK}(t)$ generated by the clock generator chip is supplied to all MMICs (master MMIC 1 and slave MMICs 2-4). In some exemplary embodiments, the master MMIC 1 can also be configured such that it merely generates the clock signal $s_{CLK}(t)$ and the LO signal $s_{LO}(t)$ for the slave MMICs 2-4 and the transmission and reception channels TX01, TX02, RX01, RX02, etc., remain unused.

Figure 6:
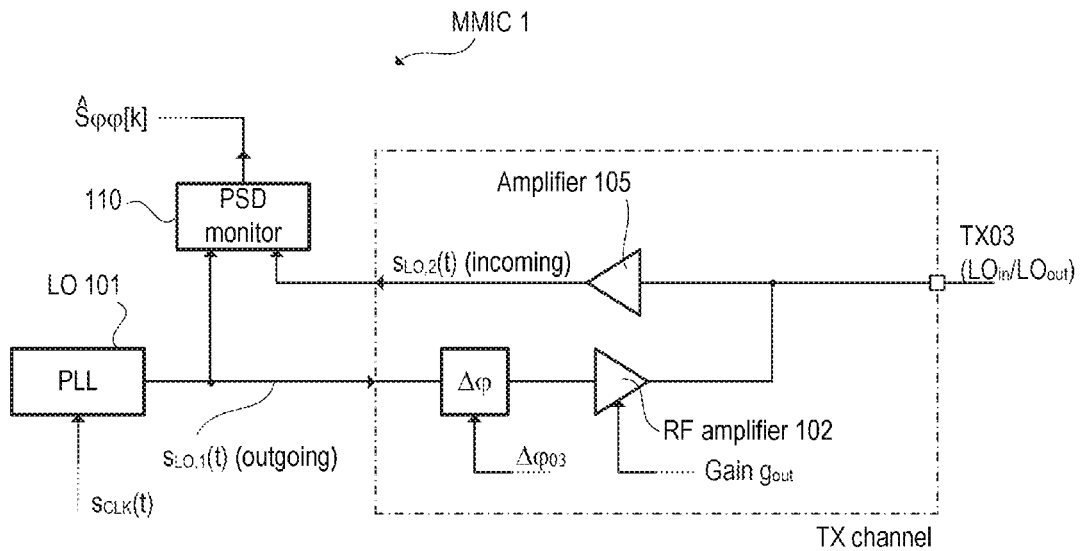
FIG. 6 shows an example of an MMIC with a configurable TX channel.

FIG. 6 illustrates part of the MMIC 1 by way of example. It depicts a transmission channel TX03 that can be configured either as a normal transmission channel (i.e. for connection of a transmission antenna) or as an LO output $LO_{out}$ or as an LO input $LO_{in}$. The configuration as a normal transmission channel and the configuration as an LO output differ only in the set gain gout of the power amplifier 102 (cf. also FIG. 4). In the mode as an LO output, less RF power needs to be provided than in the transmission mode, in which the output RF signal is emitted via an antenna. The amplifier 105 is not active in these configurations (e.g. is isolated or switched off by means of a switch). In the configuration as an LO input, the amplifier 105 is active and the power amplifier 102 is inactive (e.g. is isolated or switched off by means of a switch).

The example from FIG. 6 also contains a monitoring unit 110 that is supplied with an LO signal $s_{LO,2}(t)$ incoming via the channel T03 and with the LO signal $s_{LO,1}(t)$ generated locally by the local oscillator 101. This monitoring unit 110 is designed to ascertain an estimate for the power spectral density of the noise contained in the LO signals from the two LO signals $s_{LO,1}(t)$ and $s_{LO,2}(t)$.

Figure 7:
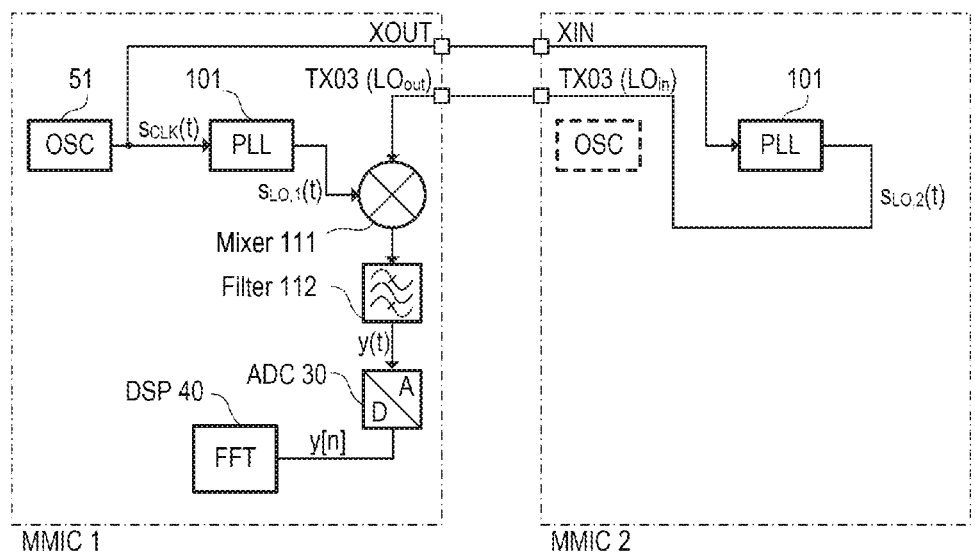
FIG. 7 is a simplified block diagram to depict the measurement of the phase noise by means of two MMICs in a system having two or more cascaded MMICs.

The cascade structure having two or more MMICs depicted in FIG. 5 can be used to indirectly determine, i.e. to estimate on the basis of measured values, the noise contained in the LO signal $s_{LO}(t)$ by virtue of the LO signals of two local oscillators being mixed. FIG. 7 is a block diagram depicting a cascade structure with just two MMICs 1 and 2, the local oscillator 101 being active for the measurement in the two MMICs. The LO signal generated by the local oscillator 101 of the MMIC 1 is denoted by $s_{LO,1}(t)$, and the LO signal generated by the local oscillator 101 of the MMIC 2 is denoted by $s_{LO,2}(t)$. The two local oscillators 101 use the same (system) clock signal $s_{CLK}(t)$, which is generated by the oscillator 51 (reference oscillator) contained in the MMIC 1, for example, and is supplied to the MMIC 2 via the clock output XOUT of the MMIC 1 and the clock input XIN of the MMIC 2 (cf. also FIG. 5).

Unlike in the normal mode, the RF input of the transmission channel TX03 is configured as an LO output $LO_{out}$ in the (slave) MMIC 2 in order to be able to supply the LO signal $s_{LO,2}(t)$ to the MMIC 1. To this end, the RF output of the transmission channel TX03 is configured as an LO input $LO_{in}$ in the (master) MMIC 1, at which LO input the LO signal $s_{LO,2}(t)$ is received. In the MMIC 1, the received LO signal $s_{LO,2}(t)$ is supplied to the monitoring unit 110, which can have a mixer 111, one or more filters 112, an analog-to-digital converter 30 and a computation unit for digital signal processing. The two LO signals $s_{LO,1}(t)$ and $s_{LO,2}(t)$ are accordingly supplied to the mixer 111, which multiplies the two LO signals. The mixer output signal is substantially subjected to low pass filtering by the filter 112 (cf. FIG. 4). Bandpass filtering would also be possible. In the example depicted in FIG. 7, the DSP 40 is used as a computation unit. Generally, the term computation unit is understood to mean any hardware or software unit or a combination of these that is suitable and designed to perform the calculations mentioned in connection with the exemplary embodiments described here.

For the remainder of the discussion, the LO signals are described as sinusoids, i.e.

$$s_{LO,1}(t) = A_1 \cdot \sin(2\pi f_{LO} t + \Phi_1 + \varphi_1(t)) \text{ and} \qquad (1)$$

$$s_{LO,2}(t) = A_2 \cdot \cos(2\pi f_{LO} t + \Phi_2 + \varphi_2(t)). \qquad (2)$$

Here, $A_1$ and $A_2$ denote the amplitudes and $f_{LO}$ denotes the frequency of the signals. $\varphi_1$ and $\varphi_2$ denote constant phase terms, and $\varphi_1(t)$ and $\varphi_2(t)$ represent phase noise (PN). Without restricting the generality, the amplitudes $A_1$ and $A_2$ can be assumed to be 1 for the considerations that follow. Other amplitude values merely bring about scaling of the measurement result by a constant factor.

The mixer 111 substantially conducts a multiplication of the two LO signals $s_{LO,1}(t)$ and $s_{LO,2}(t)$. When $A_1=1$ and $A_2=1$ and using the addition theorem $$\sin(a) \cdot \cos(b) = \tfrac{1}{2}(\sin(a-b) + \sin(a+b)) \qquad (3)$$

it follows that $$\begin{aligned} y'(t) &= s_{LO,1}(t) \cdot s_{LO,2}(t) = \\ &= \sin(2\pi f_{LO} t + \Phi_1 + \varphi_1(t)) \cdot \cos(2\pi f_{LO} t + \Phi_2 + \varphi_2(t)) = \\ &= \frac{1}{2}\begin{pmatrix} \sin(\Phi_1 - \Phi_2 + \varphi_1(t) - \varphi_2(t)) + \\ \sin(4\pi f_{LO} t + \Phi_1 + \Phi_2 + \varphi_1(t) + \varphi_2(t)) \end{pmatrix}. \end{aligned} \qquad (4)$$

On the basis of the aforementioned low-pass filtering (filter 112), the second summand in equation 3 is eliminated at the angular frequency $4\pi f_{LO}$ and the low-pass filtered signal y(t) can be described as follows:

$$y(t) = h_{TP}(t) * y'(t) \approx \tfrac{1}{2} \sin(\Phi_1 - \Phi_2 + \varphi_1(t) - \varphi_2(t)) \qquad (5)$$

$h_{TP}(t)$ denotes the impulse response of the low pass filter in this case. Without restricting the generality, the phase difference $\Phi_1 - \Phi_2$ can be assumed to be zero for the discussion that follows ($\Delta\Phi = \Phi_1 - \Phi_2 = 0$), i.e. the LO signals $s_{LO,1}(t)$ and $s_{LO,2}(t)$ are orthogonal with respect to one another (cf. equations 1 and 2). As will be shown later, a small phase difference $\Delta\Phi$ merely leads to a small DC offset in the measurement result. The assumption $\Delta\Phi = 0$ leads to:

$$y(t) = \tfrac{1}{2} \sin(\varphi_1(t) - \varphi_2(t)). \qquad (6)$$

The phase noise terms $\varphi_1(t)$ and $\varphi_2(t)$ are relatively small in practice, which is why a small-angle approximation $$\sin(a) \approx a, \text{ for } a \ll 1, \qquad (7)$$

can be made. The expression for the low-pass filtered mixer output signal y(t) can then be written as:

$$y(t) = \tfrac{1}{2}(\varphi_1(t) - \varphi_2(t)). \qquad (8)$$

This signal y(t) is open to a direct measurement and can e.g. be converted into a corresponding digital signal y[n] by means of an analog-to-digital converter (cf. FIG. 1, ADC 30). At this juncture, it should be noted that the signal y(t) is a random signal from a stationary random process, since the phase noise of the LO signals can be modeled as (quasi-)stationary random processes. The power spectral density (PSD) of the signal y(t) can be defined—on the assumption of stationary random processes—as $$S_{yy}(f) = \lim_{T \to \infty} \frac{1}{2T} |F\{y(t)\}(f)|^2 \qquad (9)$$

(F denotes the Fourier transformation operator), and an estimate can be calculated for said power spectral density from the measured digital signal y[n] by means of known methods for estimating the power spectral density (spectral density estimation)—such as e.g. using the Welch method.

In order to see how the power spectral density $S_{yy}(f)$ of the low-pass-filtered mixer output signal y(t) and the power spectral densities $S_{\varphi_1 \varphi_1}(f)$ and $S_{\varphi_2 \varphi_2}(f)$ of the phase noise terms $\varphi_1(t)$ and $\varphi_2(t)$ are interrelated, the autocovariance $C_{yy}(u)$ of y(t) is initially considered, which, taking into consideration equation 8, can be written as follows (E denotes the expectation value):

$$C_{yy}(u) = E\{y(t) \cdot y(t+u)\} = \tfrac{1}{4} E\{(\varphi_1(t) - \varphi_2(t))(\varphi_1(t+u) - \varphi_2(t+u))\}. \qquad (10)$$

By multiplying out the right-hand side of equation 10, the following is obtained:

$$C_{yy}(u) = \frac{1}{4}\left( \underbrace{E\{\varphi_1(t)\varphi_1(t+u)\}}_{C_{\varphi_1\varphi_1}(u)} - \underbrace{E\{\varphi_1(t)\varphi_2(t+u)\}}_{=0 (uncorrelated)} - \underbrace{E\{\varphi_2(t)\varphi_1(t+u)\}}_{=0 (uncorrelated)} + \underbrace{E\{\varphi_2(t)\varphi_2(t+u)\}}_{C_{\varphi_2\varphi_2}(u)} \right) = \frac{1}{4}(C_{\varphi_1\varphi_1}(u) + C_{\varphi_2\varphi_2}(u)) \qquad (11)$$

where $C_{\varphi_1\varphi_1}(u)$ and $C_{\varphi_2\varphi_2}(u)$ are the autocovariances of the phase noise terms $\varphi_1(t)$ and $\varphi_2(t)$ contained in the LO signals $s_{LO,1}(t)$ and $s_{LO,2}(t)$. As can be seen in equation 11, it has been assumed that the phase noise $\varphi_1(t)$ of the local oscillator in MMIC 1 and the phase noise $\varphi_2(t)$ of the local oscillator in MMIC 2 are uncorrelated, as a result of which the expectation values for the products $\varphi_1(t)\varphi_2(t+u)$ and $\varphi_2(t)\varphi_1(t+u)$ are zero. This assumption is justified in that the local oscillators in which the phase noise $\varphi_1(t)$ and $\varphi_2(t)$ is produced are arranged in different chips, and the random processes on which the noise is based take place independently of one another. Even if this assumption will not be exactly true in practice, the terms $\varphi_1(t)$ and $\varphi_2(t)$ are at least just weakly correlated and the expectation values for the products $\varphi_1(t)\varphi_2(t+u)$ and $\varphi_2(t)\varphi_1(t+u)$ are small enough to be able to be ignored.

According to the Wiener-Khinchin theorem, the power spectral density can be calculated for stationary random processes by means of Fourier transformation of the autocovariance function. Application of the Fourier transformation means that equation 11 gives:

$$S_{yy}(f)=F\{C_{yy}(u)\}(f)=\frac{1}{4}F\{C_{\varphi_1\varphi_1}(u)+C_{\varphi_2\varphi_2}(u)\}$$
$$(f)=\frac{1}{4}(S_{\varphi_1\varphi_1}(f)+S_{\varphi_2\varphi_2}(f)). \quad (12)$$

The right-hand side of equation 12 is half the mean value of the noise power spectral densities $S_{\varphi_1\varphi_1}(f)$ and $S_{\varphi_2\varphi_2}(f)$ of the phase noise terms $\varphi_1(t)$ and $\varphi_2(t)$. Since, in the example shown in FIG. 7, the two MMICs 1 and 2 are of substantially the same design, are normally taken from the same batch, are arranged on the same mounting board and are at substantially the same temperature during operation, the assumption that the power spectral densities $S_{\varphi_1\varphi_1}(f)$ and $S_{\varphi_2\varphi_2}(f)$ of the phase noise terms $\varphi_1(t)$ and $\varphi_2(t)$ are the same is realistic, i.e.

$$S_{\varphi_1\varphi_1}(f) \approx S_{\varphi_2\varphi_2}(f) \approx S_{\varphi\varphi}(f). \quad (13)$$

With the assumption from equation 13, equation 12 can be simplified to $$S_{yy}(f)=\frac{1}{2}S_{\varphi\varphi}(f). \quad (14)$$

In cases in which the assumption from equation 13 is not true (e.g. because one of the two local oscillators has deteriorated), the power spectral density $S_{\varphi\varphi}(f)$ (noise power spectral density) corresponds as mentioned to the mean value from the power spectral densities $S_{\varphi_1\varphi_1}(f)$ and $S_{\varphi_2\varphi_2}(f)$. Nevertheless, the mean value $(S_{\varphi_1\varphi_1}(f)+S_{\varphi_1\varphi_1}(f))/2$ characterizes the phase noise contained in the two LO signals $s_{LO,1}(t)$ and $s_{LO,2}(t)$. If one of the noise power spectral densities $S_{\varphi_1\varphi_1}(f)$ and $S_{\varphi_2\varphi_2}(f)$ does not meet the desired specifications, this is also detectable from the mean value S, (f).

As mentioned, the power spectral density $S_{yy}(f)$ can be calculated from the measured (low-pass-filtered) mixer output signal y(t) by means of known estimation methods. The sought power spectral density $S_{\varphi\varphi}(f)$ of the phase noise $\varphi_1(t)$ and $\varphi_2(t)$ can be calculated by transforming equation 14 as follows:

$$S_{\varphi\varphi}(f)=2\cdot S_{yy}(f). \quad (15)$$

In practical implementations, the power spectral density $S_{yy}(f)$ can e.g. be calculated from the digital signal y[n]=y(nT_S) ($T_S$ denotes the sampling period of the ADC 30, cf. FIG. 3). One possible estimation method is the Welch method. According to this, the power spectral density $S_{yy}(f)$ can be approximated by:

$$S_{yy}(k\cdot\Delta f)\cdot T_S^{-1} \approx \hat{S}_{yy}[k] = \frac{1}{I}\sum_{i=0}^{I-1}\left|\frac{1}{MU}\sum_{n=0}^{M-1}y^{(i)}[n]w_M[n]e^{-2\pi j\frac{n}{M}k}\right|^2, \quad (16)$$

where $\Delta f$ denotes the frequency resolution ($\Delta f=(MT_S)^{-1}$), k denotes the discrete frequency $k\Delta f$ and j denotes the imaginary unit.

In equation 16 above, the expression $$\frac{1}{MU}\sum_{n=0}^{M-1}y^{(i)}[n]w_M[n]e^{-2\pi j\frac{n}{M}k}$$

denotes the discrete, windowed Fourier transformation of the sequence $y^{(i)}[n]$ of length M and $w_M[n]$ denotes the respective window function (e.g. a Hann window) of length M and mean power U. The sequences $y^{(i)}[n]$ denote overlapping sections of the digital signal y[n], i.e.

$$y^{(i)}[n]=y[n+i\cdot D] \quad (17)$$

where for the estimation according to equation 16 a number of I sequences (i=0, ..., I−1) is considered, each of which have the length M (n=0, ..., M−1). The value D denotes the temporal offset of the sequences, $y^{(i)}[n]$, i.e. two adjacent sequences $y^{(i)}[n]$ and $y^{(i+1)}[n]$ overlap by M−D samples. The estimation according to equation 16 is accordingly based on a mean value formation for the squared (windowed) Fourier transforms of I overlapping sequences $y^{(i)}[n]$ of length M. For the sought power spectral density of the phase noise give equations 15 and 16, $$\hat{S}_{\varphi\varphi}\left(\frac{k}{M\cdot T_s}\right) = T_s\hat{S}_{\varphi\varphi}[k] = 2T_s\hat{S}_{yy}[k]. \quad (18)$$

At this juncture, it should be pointed out that other methods for estimating the power spectral density also exist and equation 16 is intended to be understood merely as an illustrative example. In practice, an FFT (Fast Fourier Transform) algorithm is normally used for calculating the Fourier transformation. For this purpose, the respective MMIC can have a processor (e.g. DSP 40, see FIG. 7). In this context, a processor is understood to mean any computation unit suitable for calculating the Fourier transformation. This can e.g. also be implemented by an array of MAC (multiply-accumulate) units. Alternatively, an external processor (e.g. a signal processor or a microcontroller) arranged on the mounting board separately from the MMICs can also be used for the calculations of the estimate of the power spectral density of the phase noise.

In the description above, it has been assumed that the RF signals $s_{LO,1}(t)$ and $s_{LO,2}(t)$ (cf. equations 1 and 2) are orthogonal. Since sine and cosine functions have a relative phase shift of $\pi/2$ (90°), this orthogonality is satisfied when the phases $\Phi_1$ and $\Phi_2$ of the RF signals $s_{LO,1}(t)$ and $s_{LO,2}(t)$ are the same. In this case, $\Phi_1-\Phi_2=0$ and the mean value of the mixer output signal y(t) becomes zero. If the phase difference $\Phi_1-\Phi_2$ does not disappear, then $\Phi_1-\Phi_2=\Delta\Ö$ and the mixer output signal y(t) can be calculated using equations 5 and 7 as follows:

$$y(t) = \frac{1}{2}(\varphi_1(t)-\varphi_2(t)) + \frac{\Delta\varphi}{2}. \quad (19)$$

A small phase difference of $\Delta\Ö$ accordingly results in a DC offset of $\Delta\Phi/2$ in the mixer output signal y(t). In the frequency domain (i.e. in the power spectral density $S_{yy}(f)$), this DC offset results in a spectral line at zero hertz that can either be filtered out by means of a high pass filter or bandpass filter (before digitization of the signal y(t)) or can be eliminated by actively tuning the phases $\Phi_1$ and $\Phi_2$ (e.g. by means of a phase shifter connected upstream of the mixer input). A decreased DC offset in the mixer output signal y(t) allows improved utilization of the dynamic range of the analog-to-digital converter. In addition to the spectral line at zero hertz, larger phase differences $\Delta\Phi$ additionally lead to scaling of the PSD according to equation 15. That is to say that for large phase differences $\Delta\Phi$ (for which the small-angle approximation cannot be used) the factor 2 needs to be replaced by the factor $2/\cos(\Delta\Phi)^2$ in equation 15. For small phase differences $\Delta\Phi$, this factor is approximately 2.

The above explanations regarding estimation of the power density of the phase noise $\hat{S}_{\varphi\varphi}(f)$ according to equation 18 are based on the signal model according to equations 1 and 2, i.e. the local oscillators 101 in the two MMICs 1 and 2 generate unmodulated, sinusoidal signals $s_{LO,1}(t)$, $s_{LO,2}(t)$ at a defined frequency $f_{LO}$. Since the phase noise is dependent on the frequency $f_{LO}$, the measurement can be repeated for multiple different frequencies. Alternatively, instead of unmodulated signals, it is also possible for (frequency-modulated) chirp signals $s_{LO,1}(t)$, $s_{LO,2}(t)$ (frequency ramps) to be used. In this case, the following signal model is obtained for the oscillator of the MMIC 1:

$$s_{LO,1}(t)=A_1\cdot\cos(2\pi f_1 t+\pi k_1 t^2+\Phi_1+\varphi_1(t)) \quad (20)$$

for $t\in[0, T]$. Here, $A_1$ denotes the amplitude, and $f_1+k_1 t/2$ is the (linearly) time-dependent instantaneous frequency $f_{LO,1}(t)$ of the chirp signal (frequency ramp). $\Phi_1$ denotes a constant phase, and $\varphi_1(t)$ represents the phase noise. The factor $k_1/2$ is the gradient $df_{LO,1}/dt$ of the frequency ramp and T is the chirp duration. Equally, the following signal model is obtained for the oscillator of the MMIC 2:

$$s_{LO,2}(t)=A_2\cdot\cos(2\pi f_2(t-t_D)+\pi k_2(t-t_D)^2+\Phi_2+\varphi_2(t-t_D)). \quad (21)$$

for $t\in[t_D, t_D+T]$. Here, $A_2$ denotes the amplitudes, and $f_2+k_2 t$ is the (linearly) time-dependent instantaneous frequency $f_{LO,2}(t)$ of the chirp signal (frequency ramp). $\Phi_2$ denotes a constant phase, and $\varphi_2(t)$ represents the phase noise. The factor $k_2$ is the gradient $df_{LO,2}/dt$ of the frequency ramp. The time $t_D$ corresponds to the propagation delay of the signal $s_{LO,2}(t)$ from the MMIC 2 to the mixer 111 in the MMIC 1 (see FIG. 7).

Without restricting the generality, the amplitudes $A_1$ and $A_2$ can again be assumed to be 1 for the considerations that follow. Other amplitude values merely bring about scaling of the measurement result by a constant factor. In addition, the same gradients are assumed, i.e. $k_1=k_2=k$. The mixer 111 essentially brings about a multiplication of the two LO signals $s_{LO,1}(t)$ and $s_{LO,2}(t)$. $A_1=1$ and $A_2=1$ and $k_1=k_2=k$ gives the following for the (unfiltered) mixer output signal $y'(t)$:

$$y'(t) = s_{LO,1}(t)\cdot s_{LO,2}(t) = \quad (22)$$

$$= \frac{1}{2}\cos\left(\underbrace{\varphi_1(t)-\varphi_2(t-t_D)}_{\varphi_D(t)} + 2\pi\underbrace{(f_1-f_2+kt_D)}_{f_D}t + \underbrace{2\pi f_2 t_D - \pi k t_D^2 + \Phi_1 - \Phi_2}_{\Delta\Phi}\right) =$$

$$= \frac{1}{2}\cos(2\pi f_D t + \varphi_D(t) + \Delta\Phi).$$

Here, $\varphi_D(t)$ denotes the difference in the phase noise terms $\varphi_1(t)$ and $\varphi_2(t-t_D)$, $f_D$ denotes the frequency difference in the two frequency ramps at the inputs of the mixer 111 and $\Delta\Phi$ denotes a constant phase term.

The mixer output signal $y'(t)$ is still filtered (filter 112), i.e. convoluted with the impulse response $h_{TP}(t)$ of the filter 112 (cf. equation 5):

$$y(t)=h_{TP}(t)*y'(t)=h_{TP}(t)*[½ \cos(2\pi f_D t+\varphi_D(t)+\Delta\Phi)]. \quad (23)$$

With the small-angle approximation (for small $\varphi_D(t)$), equation 23 gives $$y(t)\approx h_{TP}(t)*[½ \cos(2\pi f_D t+\Delta\Phi)-\varphi_D(t)½ \sin(2\pi f_D t+\Delta\Phi)]. \quad (24)$$

Assuming that the signal component at frequency $f_D$ is in the passband of the filter 112 and is passed by the latter practically without alteration, the linearity of the convolution operation means that equation 24 gives:

$$y(t)\approx ½ \cos(2\pi f_D t+\Delta\Phi)-\varphi_{D,L}(t)½ \sin(2\pi f_D t+\Delta\Phi). \quad (25)$$

Here, $\varphi_{D,L}(t)$ denotes the filtered phase noise $$\varphi_{D,L}(t)=h_{TP}(t)*\varphi_D(t) \quad (26)$$

At this juncture, it should be mentioned that phase noise can be regarded as a wide-sense stationary (WSS) process free of mean values, which is why the phase noise can be characterized by its power spectral density (PSD). The multiplication by the sine term (see equation 25) means that the filtered mixer output signal $y(t)$ is a cyclostationary process represented by the mean PSD over a period $T_D=1/f_D$. The starting frequencies $f_1$ and $f_2$ of the local oscillators can be adjusted such that the difference frequency $f_D=f_1-f_2+kt_D$ assumes a desired value (this aspect is discussed in even more detail further below). The period $T_D$ is therefore an inherently known parameter. As in the first example, the PSD is calculated from the autocovariance function.

The autocovariance $C_{yy}(u)$ of the filtered mixer output signal $y(t)$ can be calculated on the basis of equation 25 as follows:

$$C_{yy}(t, u) = E\{y(t)\cdot y(t+u)\} = \quad (27)$$

$$= \frac{1}{4}\cos(2\pi f_D t + \Delta\Phi)\cos(2\pi f_D(t+u) + \Delta\Phi) -$$

$$\frac{1}{4}\cos(2\pi f_D t + \Delta\Phi)\sin(2\pi f_D(t+u) + \Delta\Phi)\cdot\underbrace{E\{\varphi_{D,L}(t+u)\}}_{=0} -$$

$$\frac{1}{4}\cos(2\pi f_D(t+u) + \Delta\Phi)\sin(2\pi f_D t + \Delta\Phi)\cdot\underbrace{E\{\varphi_{D,L}(t)\}}_{=0} +$$

$$\frac{1}{4}\sin(2\pi f_D t + \Delta\Phi)\sin(2\pi f_D(t+u) + \Delta\Phi)\cdot$$

$$\underbrace{E\{\varphi_{D,L}(t)\varphi_{D,L}(t+u)\}}_{C_{\varphi_{D,L}\varphi_{D,L}}(u)}.$$

The two middle summands in the above equation are zero because the expectation value for the (mean-value-free) phase noise is zero. The last term in equation 27 is the autocovariance $C_{\varphi_{D,L}\varphi_{D,L}}(u)$ of the filtered, differential phase noise $$\varphi_{D,L}(t)=(\varphi_{1,L}(t)-\varphi_{2,L}(t)). \quad (28)$$

Since the phase noise terms $\varphi_1(t)$ and $\varphi_2(t)$ and thus also $\varphi_{1,L}(t)$ and $\varphi_{2,L}(t)$ are uncorrelated or at least very weakly correlated (cf. equation 11), the following holds for the autocovariance $C_{\varphi_{D,L}\varphi_{D,L}}(U)$:

$$C_{\varphi_{D,L}\varphi_{D,L}}(u)=C_{\varphi_{1,L}\varphi_{1,L}}(u)+C_{\varphi_{2,L}\varphi_{2,L}}(u). \quad (29)$$

The autocovariances $C_{\varphi_{1,L}\varphi_{1,L}}(u)$ and $C_{\varphi_{2,L}\varphi_{2,L}}(u)$ are the autocovariances of the filtered phase noise terms $\varphi_{1,L}(t)$ and $\varphi_{2,L}(t)$ in the output signals of the local oscillators of the MMICs 1 and 2. By combining equations 28 and 29, the following is obtained:

$$C_{yy}(t, u) = \frac{1}{4}\underbrace{\cos(2\pi f_D t + \Delta\Phi)\cos(2\pi f_D(t+u) + \Delta\Phi)}_{D(t)} + \quad (30)$$

-continued $$\frac{1}{4}\underbrace{\sin(2\pi f_D t + \Delta\Phi)\sin(2\pi f_D (t+u) + \Delta\Phi)}_{R(t)} \cdot$$

$$\left(C_{\varphi_{1,L}\varphi_{1,L}}(u) + C_{\varphi_{2,L}\varphi_{2,L}}(u)\right). \qquad 5$$

The terms D(t) and R(t) can be simplified as follows by applying the known addition theorems:

$$D(t)=\tfrac{1}{2}[\cos(2\pi f_D u)-\cos(2\pi f_D(2t+u)+2\Delta\Phi)], \text{ and} \qquad (31)$$

$$R(t)=\tfrac{1}{2}[\cos(2\pi f_D u)+\cos(2\pi f_D(2t+u)+2\Delta\Phi)]. \qquad (32)$$

Using equations 31 and 32, equation 30 can be simplified to $$C_{yy}(t,u)=\tfrac{1}{8}[(\cos(2\pi f_D u)-\cos(2\pi f_D(2t+u)+2\Delta\Phi))+(\cos(2\pi f_D u)+\cos(2\pi f_D(2t+u)+2\Delta\Phi))\cdot(C_{\varphi_{1,L}\varphi_{1,L}}(u)+C_{\varphi_{2,L}\varphi_{2,L}}(u))] \qquad (33)$$

As mentioned, the mixer output signal y(t) is a cyclostationary random process. Thus, the autocovariance averaged over a period $T_D=1/f_D$ is calculated by integrating equation 33:

$$\overline{C}_{yy}(u) = \frac{1}{T_D}\int_0^{T_D} C_{yy}(t,u)dt == \qquad (34)$$

$$\frac{1}{8}\left[\cos(2\pi f_D u) + \cos(2\pi f_D u)\cdot\left(C_{\varphi_{1,L}\varphi_{1,L}}(u) + C_{\varphi_{2,L}\varphi_{2,L}}(u)\right)\right].$$

The mean PSD $\overline{S}_{yy}(f)$ is obtained by means of Fourier transformation of the mean autocovariance function $$\overline{S}_{yy}(f)=F\{\overline{C}_{yy}(u)\}=\tfrac{1}{16}[S(f-f_D)+\delta(f+f_D)]+\tfrac{1}{16}[S_{\varphi_{1,L}\varphi_{1,L}}(f-f_D)+S_{\varphi_{1,L}\varphi_{1,L}}(f+f_D)+S_{\varphi_{2,L}\varphi_{2,L}}(f-f_D)+S_{\varphi_{2,L}\varphi_{2,L}}(f+f_D)]. \qquad (35)$$

Since the two MMICs 1 and 2 (and hence the two local oscillators 101, see FIG. 7) use the same system clock signal $s_{CLK}(t)$, are arranged on the same mounting board and are at substantially the same temperature during operation, the following assumptions are realistic (cf. equation 13):

$$S_{\varphi_{1,L}\varphi_{1,L}}(f-f_D)\approx S_{\varphi_{2,L}\varphi_{2,L}}(f-f_D) \text{ and} \qquad (36)$$

$$S_{\varphi_{1,L}\varphi_{1,L}}(f+f_D)\approx S_{\varphi_{2,L}\varphi_{2,L}}(f+f_D). \qquad (37)$$

Thus, the mean PSD of the phase noise of the two local oscillators can be expected:

$$S_{\overline{\varphi}_L\overline{\varphi}_L}(f-f_D)=\tfrac{1}{2}(S_{\varphi_{1,L}\varphi_{1,L}}(f-f_D)+S_{\varphi_{2,L}\varphi_{2,L}}(f-f_D)), \text{ and} \qquad (38)$$

$$S_{\overline{\varphi}_L\overline{\varphi}_L}(f+f_D)+\tfrac{1}{2}(S_{\varphi_{1,L}\varphi_{1,L}}(f+f_D)+S_{\varphi_{2,L}\varphi_{2,L}}(f+f_D)). \qquad (39)$$

Using equations (38) and (39), equation (35) can be simplified to $$\overline{S}_{yy}(f)=\tfrac{1}{16}[\delta(f-f_D)+\delta(f+f_D)]+\tfrac{1}{8}[S_{\overline{\varphi}_L\overline{\varphi}_L}(f-f_D)+S_{\overline{\varphi}_L\overline{\varphi}_L}(f+f_D)]. \qquad (40)$$

The PSD $\overline{S}_{yy}(f)$ according to equation 40 is a scaled version, frequency-shifted by $f_D$, of the mean PSD of the low-pass-filtered phase noise of the local oscillators 101 of the MMICs 1 and 2 with an additional maximum at the frequency $f_D$. By transforming equation 40, the intermediate result obtained is:

$$S_{\overline{\varphi}_L\overline{\varphi}_L}(f-f_D)+S_{\overline{\varphi}_L\overline{\varphi}_L}(f+f_D)=8\overline{S}_{yy}(f)-\tfrac{1}{2}[\delta(f-f_D)+\delta(f+f_D)]. \qquad (41)$$

The text below shows how the starting frequencies $f_1$ and $f_2$ of the chirps can be used to simplify equation 41 further.

According to equation 22, the frequency $f_D$ and the corresponding period duration $T_D$ are defined as follows:

$$f_D = \frac{1}{T_D} = (f_1 - f_2 + kt_D) \qquad (42)$$

If a periodogram (calculated by means of FFT) is used for estimating/calculating the mean PSD $\overline{S}_{yy}(f)$, averaging can be effected over any integer number n of periods. The averaging time interval T, which in the present example corresponds to the chirp duration (denoted as $T_{RAMP}$ in FIG. 2), is accordingly $$T=nT_D=n/f_D=n/(f_1-f_2+kt_D). \qquad (43)$$

The frequency $f_1$ is set to a frequency typical for radar applications, e.g. $f_1=76$ GHz. For the frequency $f_2$, the following is then obtained $$f_2 = f_1 + kt_D - \frac{n}{T}, \qquad (44)$$

and then equation 42 gives $$f_D=n/T. \qquad (45)$$

That is to say that the peak in the PSD according to equation 41 will occur at the n-th discrete frequency value (frequency bin).

If now n=1 in equations 44 and 45 and the time interval T is chosen to be comparatively long, then the frequency $f_D$ is so low that the following approximation $$S_{\overline{\varphi}_L\overline{\varphi}_L}(f)\approx S_{\overline{\varphi}_L\overline{\varphi}_L}(f-f_D)\approx S_{\overline{\varphi}_L\overline{\varphi}_L}(f+f_D) \qquad (46)$$

does not lead to a significant error. Using the approximation from equation 46, equation 41 can be simplified to $$S_{\overline{\varphi}_L\overline{\varphi}_L}(f)=4\overline{S}_{yy}(f)-[\delta(f-f_D)+\delta(f+f_D)]. \qquad (47)$$

This approach leads to a similar result to equation 15 for the measurement with unmodulated signals. Accordingly, the estimated mean PSD $\overline{S}_{yy}(f)$ is a suitable estimated value for $S_{\overline{\varphi}_L\overline{\varphi}_L}(f)$. Only the first frequency bin additionally contains the power of the signal y(t) at the frequency $f_D$. This power is a known system parameter and can be compensated for by means of digital post-processing.

In a further exemplary embodiment, n=0 can be chosen in equations 44 and 45, which results in the frequency $f_D$ becoming zero and $f_2=f_1+kt_D$. Equation 25 can thus be simplified to $$y(t)\approx\tfrac{1}{2}\cos(\Delta\Phi)-\tfrac{1}{2}\sin(\Delta\Phi)\varphi_{D,L}(t) \qquad (48)$$

and equation 27 can be simplified, taking into consideration equation 29, to $$C_{yy}(u)=E\{y(t)\cdot y(t+u)\}=\tfrac{1}{4}\quad\cos(\Delta\Phi)^2+\tfrac{1}{4}\quad\sin(\Delta\Phi)^2\cdot$$
$$C_{\varphi_{D,L}\varphi_{D,L}}(u)=\tfrac{1}{4}\quad\cos(\Delta\Phi)^2+\tfrac{1}{4}\quad\sin(\Delta\Phi)^2\cdot$$
$$(C_{\varphi_{1,L}\varphi_{1,L}}(u)+C_{\varphi_{2,L}\varphi_{2,L}}(u)) \qquad (49)$$

Since the autocovariance function has no time dependency, no averaging is necessary. The PSD $S_{yy}(u)$ is the Fourier transform of $C_{yy}(u)$, $$S_{yy}(u)=F\{C_{yy}(u)\}=\tfrac{1}{4}\quad\cos(\Delta\Phi)^2\delta(f)+\tfrac{1}{2}\quad\sin(\Delta\Phi)^2 S_{\overline{\varphi}_L\overline{\varphi}_L}(f), \qquad (50)$$

the assumptions from equations 36 to 39 having been applied as appropriate in the equation above.

Transforming equation 50 gives $$S_{\overline{\varphi}_L\overline{\varphi}_L}(f)=2S_{yy}(u)/\sin(\Delta\Phi)^2-\delta(f)\cos(\Delta\Phi)^2/(2\sin(\Delta\Phi)^2) \qquad (51)$$

It can be seen in equation 51 that $\Delta\Phi=0$ or $\Delta\Phi=\pi$ results in a division by zero occurring, which leads to numerical problems and incorrect results. This problem can be solved by measuring the DC component of the signal y(t) and ascertaining the phase $\Delta\Phi$ according to the equation below (cf. equation 22).

$$\Delta\Phi = 2\pi f_2 t_D - \pi k t_D^2 + \Phi_1 - \Phi_2 \quad (52)$$

The measurement of $\Delta\Phi$ also allows the adaptation of $\Delta\Phi$ to uncritical values, e.g. to $\Delta\Phi=\pi/2$, by adapting the phase shifts $\Phi_1$ and/or $\Phi_2$ in the local oscillators 101 of the MMICs 1 and 2.

The concepts described here with reference to FIG. 7 and equations 1 to 19 and 20 to 50 allow simple ascertainment of a performance parameter (quality parameter) for the local oscillators in the form of an estimate of the phase noise produced by the local oscillators. Since the phase noise is based on a random process, the phase noise can be characterized by the noise power spectral density. This noise power spectral density can accordingly be used as a performance parameter representing the quality of the local oscillators. Even if, in a cascade structure as shown in FIG. 5, only the local oscillator 101 of the master MMIC 1 is used in a normal mode, the phase noise is estimated by activating the local oscillators in two MMICs, e.g. in the master MMIC 1 and in the slave MMIC 2. At this juncture, it should once again be pointed out that the use of two separate local oscillators has led to the assumption of uncorrelated phase noise signals $\varphi_1(t)$ and $\varphi_2(t)$ (see equation 11). If one of the two LO signals $s_{LO,1}(t)$ and $s_{LO,2}(t)$ has increased phase noise in at least one frequency band, a measurement/estimate cannot be used to ascertain which of the two local oscillators is affected. If the measurement is repeated with different pairs of MMICs, however, the defective local oscillator can be ascertained.

Figures 8, 9:
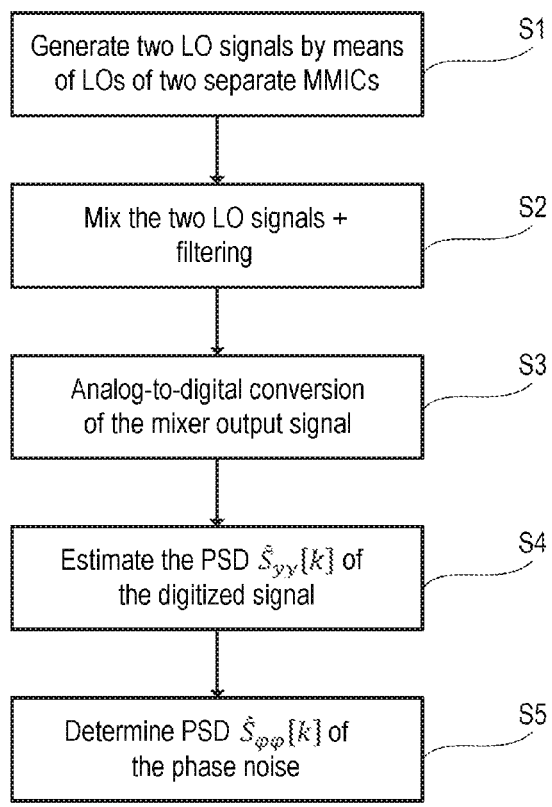
FIG. 8 shows a table to illustrate an exemplary test sequence for systems having three MMICs.
FIG. 9 is a flowchart to depict an example of a method for measuring the phase noise contained in a local oscillator signal.

The table shown in FIG. 8 shows an exemplary test sequence for a system having three cascaded MMICs 1, 2 and 3. In the normal mode, MMIC 1 can be the master MMIC (cf. FIG. 5). In a first test, the phase noise is measured by mixing the LO signals $s_{LO,1}(t)$ and $s_{LO,2}(t)$ generated in the MMICs 1 and 2. If the first test is positive (i.e. the phase noise is in a specified permissible range), then the LO in the master MMIC 1 is in order. If the first test is negative (i.e. the phase noise is outside the specified permissible range), a second test can be used to measure the phase noise by mixing the LO signals $s_{LO,1}(t)$ and $s_{LO,3}(t)$ generated in the MMICs 1 and 3. If the second test is positive, then the LO in the master MMIC 1 is in order and the LO in the slave MMIC 2 is defective, this no longer being relevant during operation, however, since the master MMIC 1 generates and distributes the LO signal. If both tests are negative, a third test can be used to measure the phase noise by mixing the LO signals $s_{LO,2}(t)$ and $s_{LO,3}(t)$ generated in the MMICs 2 and 3. If the third test is positive, then the LO in the master MMIC 1 is defective, whereas the LOs in the slave MMICs 2 and 3 are in order.

FIG. 8 is a flowchart to depict an example of the method described here. First, two different RF oscillators are used to generate two RF signals $s_{LO,1}(t)$ and $s_{LO,2}(t)$ (see FIG. 9, step S1, cf. also equations 1 and 2). The two RF oscillators can be local oscillators integrated in different MMICs (see FIG. 7). The use of two independently operating RF oscillators normally leads to the noise signals $\varphi_1(t)$ and $\varphi_2(t)$ contained in the RF signals $s_{LO,1}(t)$ and $s_{LO,2}(t)$ being uncorrelated (cf. equation 11). If the RF oscillators are of substantially the same design, however, the power spectral density of the respective noise signals $\varphi_1(t)$ and $\varphi_2(t)$ will be approximately the same (cf. equation 13). The two RF signals $s_{LO,1}(t)$ and $s_{LO,2}(t)$ are mixed (see FIG. 9, step S2), the mixed product with the frequency $2f_{LO}$ being eliminated on account of the limited bandwidth of the mixer and/or subsequent low-pass or bandpass filtering. The mixer output signal y(t) is thus substantially a DC signal overlaid with noise (cf. equation 5), which DC signal has the mean value zero if the two RF signals $s_{LO,1}(t)$ and $s_{LO,2}(t)$ at the input of the mixer 111 are orthogonal with respect to one another. A DC signal is substantially understood to mean a DC voltage signal or a DC current signal. The mixer output signal y(t) is digitized (see FIG. 9, step S3) and the digitized signal y[n] is taken as a basis for calculating an estimated value $\hat{S}_{yy}[k]$ for the power spectral density $S_{yy}(f)$ (see FIG. 9, step S4, cf. e.g. also equation 16), from which an estimated value for the power spectral density $S_{\varphi\varphi}(f)$ of the noise can then be ascertained in a simple manner (see FIG. 9, step S5).

In the examples described here, the noise contained in the RF signals $s_{LO,1}(t)$ and $s_{LO,2}(t)$ is modeled as phase noise (see e.g. signal model according to equations 1 and 2, and 20 and 21). It goes without saying that the amplitude values $A_1$ and $A_2$ in the signal models according to equations 1 and 2, and 20 and 21, can also contain noise. In the case of RF oscillators, which are normally produced by means of voltage controlled oscillators (VCOs), the phase noise contributes the majority of the overall noise floor, however, and consequently a signal model that takes account of only the phase noise is adequate in most applications.

What is claimed is:

1. A method, comprising:
   generating a first radio frequency (RF) signal by a first RF oscillator and a second RF signal by a second RF oscillator;
   mixing the first RF signal and the second RF signal by a mixer to generate a mixer output signal;
   digitizing the mixer output signal to generate a digitized signal;
   calculating an estimate for a power spectral density of the mixer output signal from the digitized signal; and
   calculating an estimate for a noise power spectral density characterizing noise contained in the first RF signal and noise contained in the second RF signal based on the calculated estimate for the power spectral density of the mixer output signal.

2. The method as claimed in claim 1, wherein the calculated estimate for the noise power spectral density represents a mean value of a noise power spectral density of phase noise contained in the first RF signal and of a noise power spectral density of phase noise contained in the second RF signal.

3. The method as claimed in claim 1, further comprising:
   filtering the mixer output signal so that the filtered mixer output signal substantially contains a direct current (DC) signal and overlaid noise.

4. The method as claimed in claim 1, further comprising:
   adjusting a phase difference between the first RF signal and the second RF signal so that the first RF signal and the second RF signal are substantially orthogonal at an input of the mixer.

5. The method as claimed in claim 1, wherein the first RF signal and the second RF signal are generated in sync by means of a reference oscillator.

6. The method as claimed in claim 1, wherein the first RF signal and the second RF signal are generated such that the noise contained in the first RF signal and the noise contained in the second RF signal are weakly correlated or uncorrelated.

7. The method as claimed in claim 1, wherein:
the first RF oscillator and the mixer are arranged in a first radar chip and the second RF oscillator is arranged in a second chip, and
wherein the second RF signal is supplied to the first radar chip via an electrical line.

8. The method as claimed in claim 1, further comprising:
checking whether the calculated estimate for the noise power spectral density is in a specified range.

9. The method as claimed in claim 8, further comprising:
if the calculated estimate for the noise power spectral density is not in the specified range:
generating a third RF signal by means of a third RF oscillator;
mixing the first RF signal and the third RF signal by the mixer to generate a further mixer output signal;
digitizing the further mixer output signal to generate a further digitized signal;
calculating a further estimate for a power spectral density of the further mixer output signal from the further digitized signal; and
calculating a further estimate for the noise power spectral density characterizing the noise contained in the first RF signal and the noise contained in the second RF signal based on the further estimate for the power spectral density of the further mixer output signal.

10. The method as claimed in claim 1, wherein the first RF signal and the second RF signal) have a constant frequency.

11. The method as claimed in claim 1, wherein the first RF signal and the second RF signal are frequency modulated.

12. The method as claimed in claim 11, wherein the first RF signal and the second RF signal have a linearly rising frequency and a frequency rise is the same for the first RF signal and the second RF signal.

13. A circuit arrangement, comprising:
a first radio frequency (RF) oscillator configured to generate a first RF signal;
a second RF oscillator configured to generate a second RF signal;
a mixer configured to receive the first RF signal and the second RF signal as input signals and generate a mixer output signal based thereon;
an analog-to-digital converter, connected downstream of the mixer, configured to digitize the mixer output signal provided by the mixer to generate a digitized mixer output signal; and
a computation unit, including at least one processor, configured to:
receive the digitized mixer output signal and to calculate an estimate of a power spectral density of the mixer output signal based on the digitized mixer output signal, and
calculate an estimate for a noise power spectral density based on the estimate of the power spectral density of the mixer output signal, the estimate for the noise power spectral density characterizing noise contained in the first RF signal and noise contained in the second RF signal.

14. The circuit arrangement as claimed in claim 13, wherein the calculated estimate for the noise power spectral density represents a mean value of a noise power spectral density of phase noise contained in the first RF signal and a noise power spectral density of phase noise contained in the second RF signal.

15. The circuit arrangement as claimed in claim 13, further comprising:
a filter, connected downstream of the mixer, configured to filter the mixer output signal, so that the filtered mixer output signal substantially contains a direct current (DC) signal and overlaid noise.

16. The circuit arrangement as claimed in claim 15, wherein the analog-to-digital converter, connected downstream of the filter, is configured to digitize the filtered mixer output signal to generate the digitized mixer output signal.

17. The circuit arrangement as claimed in claim 13, further comprising:
at least one phase shifter, connected upstream of an input of the mixer, configured to adjust a phase difference between the first RF signal and the second RF signal such that the first RF signal and the second RF signal are substantially orthogonal at the input of the mixer.

18. The circuit arrangement as claimed in claim 13, further comprising:
a circuit carrier on which a first chip and a second chip are arranged, wherein the first RF oscillator and the mixer are arranged in the first chip and the second RF oscillator is arranged in a second chip, and the second RF oscillator in the second chip is connected to the mixer in the first chip via an electrical line arranged on the circuit carrier.

19. The circuit arrangement as claimed in claim 13, further comprising:
at least one chip,
wherein each of the at least one chip has multiple transmission channels and multiple reception channels,
wherein at least one transmission channel of the multiple transmission channels of each chip is configured to boost the first RF signal and to provide the boosted first RF signal as a radar signal at an output of the at least one transmission channel, and
wherein each reception channel of each chip is configured to receive an incoming radar echo signal and to mix the incoming radar echo signal with the first RF signal.

20. The circuit arrangement as claimed in claim 19, wherein:
the at least one chip includes a first chip and a second chip, and the multiple transmission channels of the first chip and the second chip each include a configurable transmission channel,
the configurable transmission channel of the first chip is connected to the configurable transmission channel of the second chip via an electrical line, and
wherein the configurable transmission channel of the first chip and the configurable transmission channel of the second chip are each configurable either as an input or as an output for the first RF signal or the second RF signal.

* * * * *